United States Patent Office 3,412,663
Patented Nov. 26, 1968

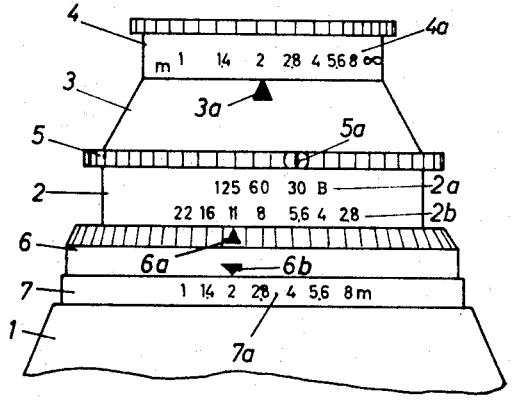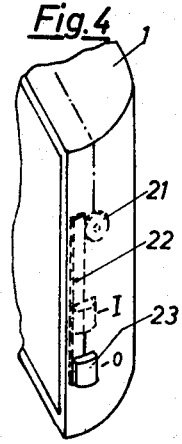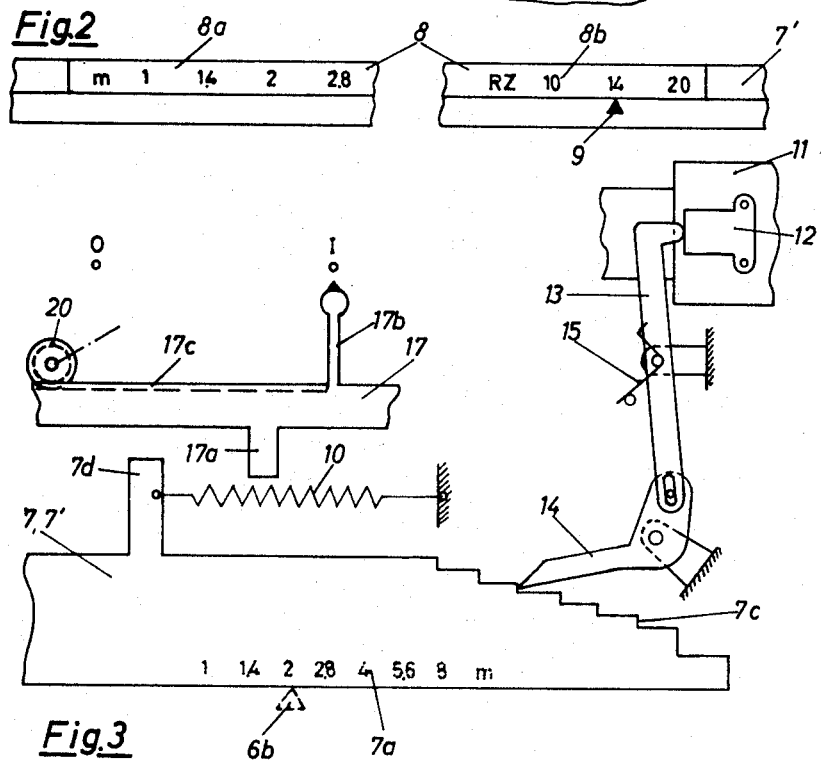

3,412,663
CAMERA WITH SEMI-AUTOMATIC DIAPHRAGM OPERATION FOR PHOTOFLASH EXPOSURES
Waldemar T. Rentschler, Calmbach, Black Forest, Germany, assignor to Prontor-Werk Alfred Gauthier, G.m.b.H., Calmbach, Black Forest, Germany, a corporation of Germany
Filed July 22, 1966, Ser. No. 567,229
Claims priority, application Germany, July 23, 1965, P 37,308
10 Claims. (Cl. 95—11)

This invention relates to a camera with a diaphragm semi-automatically controlled for making photoflash pictures and having a main focusing scale and an auxiliary focusing scale with corresponding focal settings but placed on the camera to cooperate with the diaphragm aperture setting control.

It has been known heretofore to provide a diaphragm setting control and an auxiliary focusing scale having indicia corresponding to the main focusing scale of the camera. In such cameras, the diaphragm may be set semi-automatically by setting the focusing control and then placing the diaphragm aperture control in the proper position with respect to the numerical value of the auxiliary focusing scale. For making allowance for the various guide numbers of different photoflash bulbs it has further been known to move the auxiliary range scale manually into various positions relative to a stationary index.

It is one object of the present invention to make the use of known semi-automatic diaphragm setting means for photoflash pictures possible for cameras equipped to use film cartridges or film cassettes provided with a film sensitivity indicator. In the following specification and claims, the term "cassette" will be used to denote both cartridges and cassettes.

In carrying out this object it is proposed, in accordance with the present invention, to place an auxiliary range scale on a movable setting member and to shift the position of the setting member relative to a stationary point on the camera by means of the film sensitivity indicator on the film cartridge or cassette. This results in a relatively simple structure and yet causes the film sensitivity to be taken into account automatically in making photoflash pictures, even in cameras which are designed for the simplified type of operation possible with cassettes.

In order to permit the use of photoflash bulbs, or sources, of different intensity, it is further proposed to provide the auxiliary range scale on a separate carrier on the movable setting member and capable of being set with respect thereto with the aid of a scale of flash indices.

A further proposal included in the present invention is that the sensitivity of the film inserted into the camera be taken into consideration in a simple manner for photoflash pictures by means of a step cam that cooperates with a catch device, the setting of which is determined by the sensitivity indicator of the cassette. This arrangement assures that the sensitivity of the film material will be reliably and accurately utilized in establishing the exposure parameters.

A further proposal of the present invention is to simplify the mechanism by having a catch device provided with a feeler lever to contact the film sensitivity indicator on a cassette. A catch lever is linked with the feeler lever to transmit to the movable setting member the information derived from the positioning of the feeler lever.

Still another feature of the invention is that an additional setting device is provided capable of being set to at least two positions, which, for convenience, are indicated as I and O. The additional setting device includes means to move the setting member with the auxiliary focusing scale to an end position when the additional setting device is placed in the O position. This end position of the setting member places the step cam of the setting member outside the range of motion of the catch lever and is therefore the position to be occupied when the film cassettes are being changed. Preferably the setting member on which the auxiliary focusing scale is inscribed has a return spring connected to it to bias it resiliently in one direction.

To simplify the changing of film cassettes, it is proposed in the present invention that the additional setting device be connected to a locking slide on the camera housing in such a way that the additional setting device moves into the I position when the slide is in its locked position and into the O position when the slide is in its open position. Furthermore, for reasons of safer handling, a locking lever may be provided to cooperate with the locking slide to permit the slide to be actuated for opening the camera housing only after the additional setting device has been moved into its O position.

Finally, another improvement of the invention includes means for excluding improper handling, such means including a device that may be controlled by the additional setting device to act upon suitable means to prevent the shutter release from being used unless the additional setting device has first been moved into the I position, as is required in order to introduce the film sensitivity value.

The invention will be described in greater detail in the following specification, together with drawings in which:

FIG. 1 shows a partial top view of a camera constructed according to the invention;

FIG. 2 illustrates a setting member with an auxiliary focusing scale and a guide number scale to take photoflash pictures with photoflash sources of different intensity;

FIG. 3 is a schematic representation of the setting member and shows a focusing scale in connection with a catch operating with this setting member; and FIG. 4 shows a partial, perspective view of a camera housing constructed according to the invention and shown with the housing cover opened up.

FIG. 1 shows a fragment of a housing 1 of a camera to which is attached an objective lens and shutter with setting devices for shutter speed and diaphragm aperture size. The shutter includes a housing 2 and a front plate 3. An objective tube 4 is rotatably mounted in the shutter and carries a range scale, or focusing scale, 4a which may be set with reference to a stationary mark 3a on the front plate 3. A shutter speed, or exposure time, setting scale 2a is located on shutter housing 2 along with a diaphragm setting scale 2b. The shutter speed scale 2a is set with reference to a mark 5a on a shutter speed setting member 5, while the diaphragm aperture is set with reference to a mark 6a on a diaphragm setting member 6. The diaphragm setting member 6 also has a mark 6b located directly opposite the 6a and capable of being set with respect to a movable member 7 on which there is an auxiliary focusing scale 7a.

If the camera is constructed to use only a single type of photoflash bulb, such as an AG-1 bulb to take photoflash pictures, the auxiliary focusing scale can be fixed, or printed on the setting member 7. But if different types of flashbulbs are to be used, each with its own characteristic intensity, an auxiliary focusing scale 8a, which may be seen in FIG. 2, is arranged on a special carrier 8 to be set and fixed with respect to a setting member 7'. In this case it is desirable for the auxiliary focusing scale 8a to have a guide number scale 8b in continuation of the scale sequence to be set with respect to an index 9 and having scale values that include the guide number at a certain film sensitivity, for example 18°.

As may be seen in FIG. 3, the setting member 7 or 7' on which the focusing scale 7a or 8a is located can be formed with a step curve 7c. This step curve can either be located directly on the setting members 7 or 7' or it can be attached to or formed as a part of an additional component attached to the setting member. In addition, if the setting member 7 or 7' is in the form of a ring, the step curve 7c can be placed either on the radial or axial side of the ring. As to the gradation itself, it is desirable to correlate a certain distance value, as indicated on the auxiliary focusing scale, with each individual step. A return spring 10 is attached to the setting member 7 or 7' to keep the setting member in a starting position at all times.

FIG. 3 illustrates schematically a film cassette 11. This cassette, or cartridge, has a film which threads itself automatically onto a wind-up spool when placed in the camera. Such cassettes are well known and are provided with a riveted tab, or indicator, 12, or a similar structure, having an arrangement or length which differs depending on the sensitivity value of the film material wound in the cassette. The indicator 12 thus automatically indicates the film sensitivity and can be made to interact with the step curve 7c by means of a catch device which will be described in detail hereinafter, the coaction of the indicator and the step curve being such that the setting member 7 or 7', after insertion of the cassette 11, assumes a certain set position corresponding to the sensitivity of the film in the cassette.

For this purpose the catch may be in the form of a feeler lever 13 pivotly mounted on a stationary pivot having one end positioned to make contact with indicator 12 of the cassette. The other end of the lever 13 is joined by a pin and slot connection to one arm of a catch lever 14 mounted on a stationary pivot. A spring 15 engages the lever 13 to hold it in contact with the indicator 12 while the articulated joint between the feeler lever and the catch lever is so arranged that, as the film cassette 11 is removed from the camera housing 1, the catch lever simultaneously recedes out of the range of motion of the setting member 7 or 7' that carries the auxiliary range scale 7a or 8a.

As has already been described, the setting member 7 or 7' respectively, is resiliently pulled by the spring 10 toward the right. When the setting member 7 or 7' is released, it is free to move from an end position to a position in which one of its steps strikes against the catch lever 14.

To make sure that the film cassettes may be inserted freely, it is recommended that the setting member 7 or 7' be brought into a certain end position prior to the insertion of the film pack and kept in that position until loading of the camera is completed. An additional setting device 17 helps in doing this. As may be seen in FIG. 3, the additional setting device can be set to an I position or to an O position as indicated by a pointer arm 17b. The additional setting device 17 has a driving tab 17a while the setting member 7 or 7' has a corresponding tab 7d to make contact with the tab 17a. When the additional setting device 17 is moved so that the pointer 17b is opposite the letter I, the setting member 7 or 7' that carries the auxiliary range scale 7a or 8a follows the motion of the additional setting device 17 until catch lever 14 engages one of the steps 7c. Just which one of the steps will be engaged will be determined by the indicator 12 of the film cassette.

When the additional setting device 17 is in the other end position, that is with the pointer 17b opposite O, the setting member 7 or 7' will be moved so far to the left with respect to the arrangement shown in FIG. 3 that the catch lever 14 can move freely over the entire range of the steps 7c. In order to make sure of this, the additional setting device 17 can be maintained effectively with the opening and closing mechanism of the camera housing 1, as for example by means of a slide partly indicated in the drawing. The connection through which power is transmitted may be by way of a pinion 20 engaging teeth 17c on the additional setting device 17. The pinion 20 is connected to another pinion 21 by additional gearing components indicated in the drawing only by a dot-dash line. In turn the pinion 21 may be in mesh with a rack slide 22 mounted so as to be movable in the camera 1 and carrying a slide button 23 which is part of a locking mechanism to lock the cover of the camera housing. As shown in FIG. 4, the two positions I and O which the additional setting device 17 can assume can be inscribed on the camera housing 1 alongside the respective end positions of the slide button 23.

Depending on the given structural design of the camera, the power transmission members that effectively connect the additional setting device 17 to the slide button 23 can be omitted and in their place a detent, such as a locking member or the like, may be associated with the slide button which allows actuation of the opening and closing mechanism of the camera housing only when the pointer 17b is in the O position.

To be certain that the photographer does not forget to change the additional setting device 17, which is in the O end position as indicated by the pointer 17b when the camera is open, to the I end position after the camera housing has been closed, an additional device can be provided to lock the shutter release trigger of the camera or to cover the view finder as long as the additional setting device has not been changed to the I end position. Such an extra device may be in the form of a gear or lever mechanism cooperating with a covering flap that swings into the range of the view finder or with a locking lever associated with the shutter release trigger. Moreover such a device would have to be under the control of the additional setting device 17 in such a way that the view through the finder would be blocked and actuation of the shutter release trigger prevented unless the setting device was in the I position because it is only in this position that the indicator 12 of the film cassette 11 can make allowance for the sensitivity of the film.

The foregoing mechanism operates as follows for semi-automatically making allowance for the sensitivity value of the film:

After a film cartridge or cassette 11 has been inserted into the camera housing 1 and the additional device 17 has been changed from the O position to the I position, the setting member 7 or 7', carrying the auxiliary range scale 7a or 8a, respectively, moves into a particular relative position depending on the indicator 12 of the film cassette. If the photographer intends to take photoflash pictures, he must first set the focus control 4. The position of the focus control in FIG. 1 indicates a distance of 2 meters. With the aid of the diaphragm control 6, the photographer need do nothing more than place the mark 6b opposite the scale value 2 of the auxiliary range scale 7a or 8a.

In doing so, the photographer has at the same time controlled the diaphragm mechanism so that the aperture value 11 will be reached as indicated by the mark 6a on the stationary diaphragm setting scale 2b. Thereafter the photographer must look to see that the shutter speed control has been set for a time suitable for making photoflash exposures, and if it has not been so set, he must set it at a value, for example, of 1/30 of a second as indicated by the position of the mark 5a opposite the numeral 30 on the scale 2a. The setting member 7 or 7' remains in its set position until the film cassette 11 that controls this position has been removed from the camera housing 1.

It will be understood that while the invention has been described in detail in connection with a specific example thereof in order to describe the same this description is not to be considered as a limitation upon the scope of the invention. Variations and modifications may be made without departing from the spirit of the invention or defined in the appended claims.

What is claimed is:

1. A camera comprising: a housing; a lens; a focusing control; a main focusing scale to indicate the focal setting of said lens; a movable setting member; an auxiliary focusing scale associated with said setting member; automatic means connected to said setting member to govern the setting thereof according to film sensitivity; a diaphragm setting control; and means to set said diaphragm setting control at a position with respect to said auxiliary focusing scale corresponding to the focal setting on said main focusing scale.

2. The camera of claim 1 comprising, in addition: a carrier attached to said movable setting member to be moved thereby; and means associated with said carrier to set said carrier according to the film sensitivity, said auxiliary focusing scale being located on said carrier.

3. The camera according to claim 1 in which said movable setting member comprises a step cam, and said automatic means comprises a catch set to a position determined by the film sensitivity and cooperating with said step cam to confirm the position of said movable setting member.

4. The camera of claim 3 in which said catch comprises a feeler lever to be pivoted according to the sensitivity of the film, and a catch lever articulately connected to said feeler lever.

5. A camera comprising: a housing; a film cassette comprising indicator means to indicate the sensitivity of the film in the casette; a lens; a focusing control; a main focusing scale to indicate the focal setting of said lens; a movable setting member; an auxiliary focusing scale associated with said setting member; automatic means engageable with said indicator means to govern said settting member according to the sensitivity of said film; a diaphragm setting control; and means to set said diaphragm setting control at a position with respect to said auxiliary focusing scale corresponding to the focal setting on said main focusing scale.

6. The camera of claim 5 comprising, in addition: an additional setting device settable to a first position for receiving said film cassette in said camera and settable to a second position for operation, said additional setting device comprising means to engage said movable setting member to move said setting member away from said automatic means in order to allow the insertion of the film in said camera.

7. The camera of claim 6 comprising, in addition: a return spring resiliently biasing said setting member toward said additional setting device and toward said automatic means.

8. The camera of claim 7 comprising, in addition: a locking slide; power transmission means connecting said locking slide to said additional setting device, said locking slide being arranged to move said additional setting device to its first position when said camera is unlocked and to said second position when said camera is locked.

9. The camera of claim 8 comprising, in addition: a locking device connected to said locking slide to permit actuation of said slide to open the said camera housing only after said additional setting device has been moved into its first position.

10. The camera of claim 7 comprising, in addition: means connected to said additional setting device to permit operation of said camera only after said additional setting device has been moved to its second position.

References Cited

UNITED STATES PATENTS

| | | | |
|---|---|---|---|
| 2,985,082 | 5/1961 | Starp | 95—64 X |
| 3,208,363 | 9/1965 | Easterly et al. | 95—11 |
| 3,257,920 | 6/1966 | Greger et al. | 95—11 |
| 3,326,107 | 6/1967 | Rentschler | 95—64 |

NORTON ANSHER, *Primary Examiner.*

CHARLES E. SMITH, *Assistant Examiner.*